United States Patent
Pohlmann et al.

(10) Patent No.: US 9,224,528 B2
(45) Date of Patent: Dec. 29, 2015

(54) ELECTROMAGNETICALLY ACTUATABLE VALVE

(75) Inventors: Jens Pohlmann, Bietigheim-Bissingen (DE); Juergen Graner, Sersheim (DE)

(73) Assignee: ROBERT BOSCH GMBH, Stuttgart (DE)

(*) Notice: Subject to any disclaimer, the term of this patent is extended or adjusted under 35 U.S.C. 154(b) by 585 days.

(21) Appl. No.: 13/512,513

(22) PCT Filed: Oct. 7, 2010

(86) PCT No.: PCT/EP2010/065024
§ 371 (c)(1),
(2), (4) Date: Aug. 3, 2012

(87) PCT Pub. No.: WO2011/067021
PCT Pub. Date: Jun. 9, 2011

(65) Prior Publication Data
US 2012/0305816 A1 Dec. 6, 2012

(30) Foreign Application Priority Data
Dec. 4, 2009 (DE) .......................... 10 2009 047 525

(51) Int. Cl.
*F16K 31/02* (2006.01)
*H01F 7/08* (2006.01)
*F16K 31/06* (2006.01)
(Continued)

(52) U.S. Cl.
CPC .............. *H01F 7/081* (2013.01); *B22F 3/225* (2013.01); *F02M 51/0664* (2013.01); *F02M 63/007* (2013.01); *F16K 31/0655* (2013.01); *F02M 2200/08* (2013.01); *F02M 2200/8046* (2013.01); *H01F 41/0246* (2013.01);
(Continued)

(58) Field of Classification Search
CPC ............ F16K 31/0655; F16K 31/0658; F02M 51/0671; F02M 51/0664; F02M 63/007; F02M 2200/8046; F02M 2200/08; H01F 7/16; H01F 7/1607; H01F 7/081; H01F 41/0246; H01F 2007/1676; H01F 2007/086; B22F 3/225; Y10T 29/4902
USPC ..................... 251/129.01, 129.15; 239/585.1; 335/279, 281; 137/15.01, 15.18; 29/592.1, 602.1
See application file for complete search history.

(56) References Cited

U.S. PATENT DOCUMENTS 3,977,436 A * 8/1976 Larner ..................... 137/625.65
4,538,130 A * 8/1985 Gluckstern et al. ........... 335/306
(Continued)

FOREIGN PATENT DOCUMENTS

| DE | 196 39 117 | 3/1998 |
|---|---|---|
| DE | 199 24 814 | 12/2000 |

(Continued)

OTHER PUBLICATIONS

International Search Report for PCT/EP2010/065024, dated Apr. 5, 2011.

*Primary Examiner* — John Bastianelli
(74) *Attorney, Agent, or Firm* — Kenyon & Kenyon LLP

(57) ABSTRACT

An electrically actuatable valve for injecting fuel includes a magnetic actuator having multiple components, at least one component of the magnetic actuator having multiple sectors made of soft magnetic material and multiple insulating separating webs. A separating web is situated between each two neighboring sectors and entirely separates the neighboring sectors from one another electrically.

8 Claims, 1 Drawing Sheet

(51) Int. Cl.
  *B22F 3/22* (2006.01)
  *F02M 51/06* (2006.01)
  *F02M 63/00* (2006.01)
  *H01F 41/02* (2006.01)
  *H01F 7/16* (2006.01)

(52) U.S. Cl.
  CPC .. *H01F 2007/086* (2013.01); *H01F 2007/1676* (2013.01); *Y10T 29/4902* (2015.01)

(56) References Cited

U.S. PATENT DOCUMENTS

| | | | | |
|---|---|---|---|---|
| 5,207,410 | A * | 5/1993 | Wakeman | 335/281 |
| 5,515,818 | A * | 5/1996 | Born | 123/90.11 |
| 5,915,626 | A * | 6/1999 | Awarzamani et al. | 239/585.1 |
| 6,157,281 | A * | 12/2000 | Katznelson et al. | 335/306 |
| 6,322,048 | B1 * | 11/2001 | Gramann et al. | 251/129.16 |
| 6,779,554 | B2 * | 8/2004 | Weis et al. | 251/333 |
| 7,004,450 | B2 * | 2/2006 | Yoshimura et al. | 251/129.15 |
| 7,128,032 | B2 * | 10/2006 | Froeschle et al. | 123/90.11 |
| 2003/0062660 | A1 | 4/2003 | Beard et al. | |
| 2004/0118952 | A1 | 6/2004 | Nussio | |
| 2008/0061171 | A1 * | 3/2008 | Bayer | 239/585.3 |
| 2009/0139491 | A1 * | 6/2009 | Joshi et al. | 123/476 |

FOREIGN PATENT DOCUMENTS

| | | |
|---|---|---|
| DE | 100 31 923 | 1/2002 |
| DE | 100 63 549 | 7/2002 |
| EP | 2 172 641 | 4/2010 |
| JP | 3-122514 | 12/1991 |
| JP | 5-83361 | 11/1993 |
| JP | 2000-501570 | 2/2000 |
| JP | 2003-515944 | 5/2003 |
| JP | 2005-20983 | 1/2005 |
| WO | WO 2010/088109 | 8/2010 |

* cited by examiner

ELECTROMAGNETICALLY ACTUATABLE VALVE

BACKGROUND OF THE INVENTION

1. Field of the Invention

The present invention relates to an electromagnetically actuatable valve, in particular a fuel injector, having a magnetic actuator, as well as a method for manufacturing components of a magnetic actuator, for example, a magnet armature.

2. Description of the Related Art

High-pressure injectors of the related art are essentially designed as conventional solenoid switching valves having a coil and components of a magnetic actuator, for example, a magnet armature, an internal pole, an external pole, which are manufactured as turned parts from a soft magnetic bar material. The electrical properties of the material and the 360°-closed contour of the components cause eddy current losses and consequently a reduced switching time or dynamics of the fuel injector when the magnetic field is built up and reduced during operation.

BRIEF SUMMARY OF THE INVENTION

The electromagnetically actuatable valve according to the present invention has the advantage over the related art that it has components of a magnetic actuator such as a magnet armature and/or an internal pole and/or an external pole, which make it possible to considerably reduce the eddy current losses in the case of magnetic field changes and significantly reduce the valve's switching time. According to the present invention, this is achieved in that the valve has at least one component of a magnetic actuator having a plurality of sectors made of soft magnetic material and a plurality of insulating separating webs, a separating web being situated between each two neighboring sectors and entirely separating the neighboring sectors from one another electrically. The components of the magnetic actuator thus have at least two soft magnetic sectors and two insulating separating webs.

Preferably, the separating webs are in this case manufactured from a material which includes a ceramic. The electrically non-conductive properties of the ceramic material ensure that the individual adjacent sectors of the components of a magnetic actuator are reliably separated or insulated electrically.

The valve preferably includes at least one component of the magnetic actuator having exactly four sectors and four separating webs. As a result, even a small number of sectors and separating webs causes the eddy current losses to be reduced drastically in the case of magnetic field changes.

According to another preferred embodiment, the separating webs have a width which is selected in such a way that neighboring sectors are reliably separated in a straight manner from one another electrically. By minimizing the width and the material portion of the separating webs, only a slight amount of soft magnetic material of the magnet armature is lost, thus ensuring that the strength of the magnetic circuit is essentially consistent.

Preferably at least one component of a magnetic actuator is manufactured using a PIM method (powder injection molding method). Using this multi-component powder injection molding process instead of a turning process makes it possible to manufacture components of a magnetic actuator with short production times and low unit costs in a simple way. The method according to the present invention may be designed in such a way that the insulating separating webs are manufactured in a first step, the insulating separating webs are then held mechanically in a die, and the sectors made of soft magnetic material are subsequently injection-molded. Alternatively, the soft magnetic sectors may be manufactured in a first step. Subsequently, these sectors are placed into a die and held in position with the aid of a magnetic field, and the separating webs are injection-molded into the intermediate spaces between the soft magnetic sectors in a subsequent step. Thus, a cost-effective manufacture of a component for a magnet armature may be implemented according to the present invention, the component having thin-walled, electrically non-conductive separating webs between soft magnetic sectors. This makes it possible to minimize the formation of eddy currents which counteract the build-up and reduction of fields. The separating webs must be as thin-walled as possible, so that little magnetic material volume is lost, which would negatively influence the achievable magnetic force. The method according to the present invention demonstrates for the first time a production-oriented implementation of the relatively demanding manufacture, since the separating webs or the soft magnetic sectors must be held at a distance in order to be able to manufacture the particular other element with the aid of an injection molding process. According to the present invention, it is thus possible to use a multi-component PIM method for manufacturing one or multiple components of a magnetic actuator such as a magnet armature or a pole core, i.e., internal pole, or a valve jacket, i.e., external pole (feedback element). Particularly preferably, the soft magnetic sectors may be manufactured with the aid of a metal injection molding method (MIM). The insulating separating webs may preferably be manufactured with the aid of a ceramic injection molding method (CIM). The soft magnetic sectors may be positioned in an injection molding die with the aid of a magnetic force, so that open spaces are present between them for the insulating separating webs to be injection-molded. The separating webs may be held in the injection molding die mechanically. Thus, a very economical manufacturing method is achievable.

The method according to the present invention for manufacturing a component of a magnetic actuator having a plurality of sectors made of soft magnetic material and a plurality of insulating separating webs with the aid of a PIM process makes it possible to economically manufacture a component in which the switching times and in particular the break times are drastically reduced, thus resulting in a significantly reduced amount of fuel needed for injection into the combustion chamber when the component is used in a motor vehicle, for example. The reduced injection amount improves the idling behavior of the engine and makes an improved multiple injection of the fuel injectors possible. This results in a significantly improved exhaust gas behavior of the engine.

DETAILED DESCRIPTION OF THE INVENTION

Figure 1:
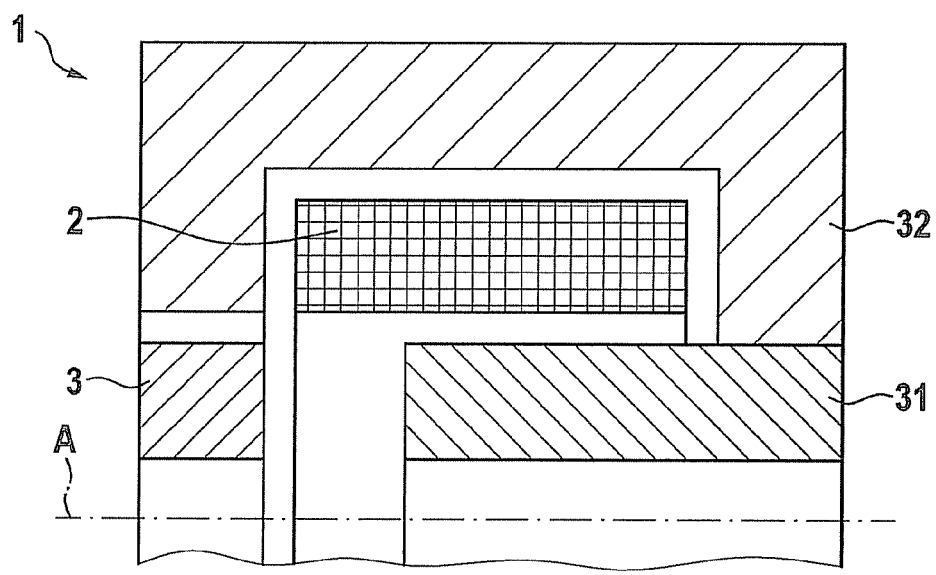
FIG. 1 shows a schematic sectional view of a magnet armature of a fuel injector.
Figure 2:
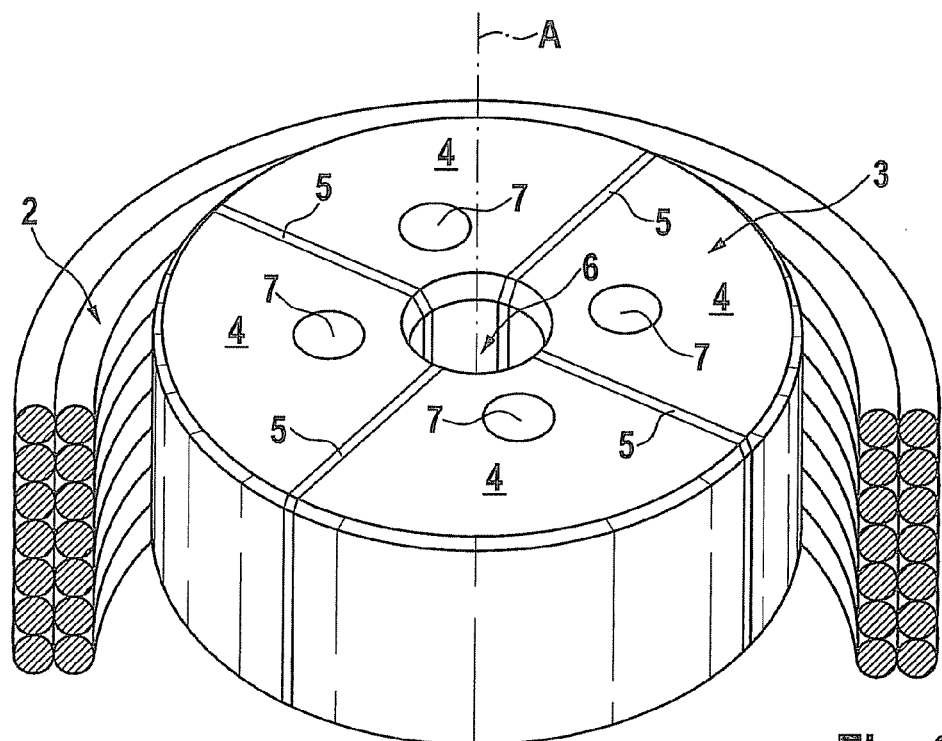
FIG. 2 shows a perspective representation of a magnet armature of the fuel injector according to the present invention.

With reference to FIGS. 1 and 2, a fuel injector for injecting fuel according to a preferred exemplary embodiment of the present invention and a method for manufacturing a magnet armature of a magnetic actuator of fuel injector 1 are described in detail below.

As is apparent from the perspective representation of FIG. 1, the valve includes a magnetic actuator 1 having a magnet armature 3, a pole core 31, a valve jacket 32 as a feedback element and a coil 2 which surrounds magnet armature 3. Magnet armature 3 manufactured from a soft magnetic material has a central through opening 6 situated in an axial direction A, a valve needle (not shown in the representation) being situated in the through opening. Furthermore, magnet armature 3 has four fuel openings 7 running in axial direction A, each of which being situated in one of four sectors 4. As is further apparent from FIG. 2, each sector 4 includes essentially one fourth of the volume of magnet armature 3 in the circumferential direction. An insulating separating web 5 made of a ceramic material is situated between each two neighboring sectors 4, the separating web electrically separating or insulating adjacent sectors 4. As an alternative to the specific embodiment shown here, the number of sectors 4 or separating webs 5 may be varied appropriately according to a desired function of magnet armature 3 in fuel injector 1; however, at least two separating webs must be present.

A component of the magnetic actuator is manufactured using a multi-component powder injection molding process (PIM process). The component, such as a magnet armature, may be manufactured using two alternative methods. Since the component is formed from two component groups, namely sectors 4 and separating webs 5, a first of the two component groups may be manufactured, preferably with the aid of an injection molding method, in a first step. In a next step, the first component group is then positioned in an injection molding die, and subsequently the second component group is injection-molded in the intermediate spaces among the portions of the first component group using an injection molding method. If the first component group is made up of insulating separating webs 5, these are held mechanically in the injection-molding die and the soft magnetic sectors 4 are then injection-molded between separating webs 5 using a metal injection-molding method. If the first of the component groups are soft magnetic sectors 4, sectors 4 are manufactured with the aid of a metal injection molding method and subsequently held in the injection molding die with the aid of a magnetic field. Separating webs 5 are then injection-molded between the intermediate spaces of soft magnetic sectors 4 with the aid of a ceramic injection molding method. Preferably, powder injection molding methods are used as injection molding methods.

The valve according to the present invention and the manufacturing method according to the present invention significantly improve the dynamics characteristics, which are desired and required in particular in high-pressure injectors, according to the thus achievable reduction in eddy current losses, which contributes to considerably improved fuel consumption and emission characteristics of the engine.

What is claimed is:

1. A method for manufacturing a component of a magnetic actuator, wherein the component is one of a magnet armature, an internal pole or an external pole, the method comprising:
    manufacturing two different subcomponent groups of the component in a manufacturing sequence, a first subcomponent group including a plurality of sectors made of soft magnetic material and a second subcomponent group including a plurality of insulating separating webs;
    wherein one of:
    (i) manufacturing the first subcomponent group in a first step of the manufacturing sequence using an injection molding die such that the soft magnetic sectors of the first subcomponent group are held in the injection molding die with the aid of magnetic force, and subsequently injection-molding the insulating separating webs of the second subcomponent group between the soft magnetic sectors with the aid of a ceramic injection molding method; and
    (ii) manufacturing the second subcomponent group in a first step of the manufacturing sequence using the injection molding die such that the insulating separating webs of the second subcomponent group are held mechanically in the injection molding die, and subsequently injection-molding the soft magnetic sectors of the first subcomponent group between the insulating separating webs with the aid of a metal injection molding method.

2. The method as recited in claim 1, wherein at least one of the first component group and the second component group is manufactured with the aid of a powder injection molding method.

3. An electrically actuatable valve, comprising:
    a magnetic actuator having multiple components;
    wherein at least one component of the magnetic actuator includes (i) a plurality of sectors made of soft magnetic material and (ii) a plurality of insulating separating webs,
    wherein at least one of the separating webs is situated between each two neighboring sectors and entirely separates the two neighboring sectors from one another electrically;
    wherein the component of the magnetic actuator is a magnet armature, the magnetic armature having a central through opening inside which a valve needle is disposed, which forms a valve component that is movable along a central axis;
    wherein the plurality of sectors and insulating separating webs are disposed in the circumferential direction; and
    wherein a magnetic coil at least partially surrounds the magnetic armature in the axial direction.

4. The valve as recited in claim 3, wherein the separating web includes a ceramic material.

5. The valve as recited in claim 3, wherein the magnetic armature includes exactly four sectors and four separating webs.

6. The valve as recited in claim 3, wherein the soft magnetic sectors of the magnet armature are manufactured with the aid of a metal injection molding method (MIM).

7. The valve as recited in claim 3, wherein the valve is a fuel injector.

8. The valve as recited in claim 3, wherein a fuel opening is provided in the sectors of the magnetic armature.

* * * * *